Dec. 2, 1969    R. J. DIEKER    3,481,591
CUTTING APPARATUS WITH ADJUSTABLE CRADLE TO HOLD WORKPIECE
Filed Nov. 21, 1967    2 Sheets-Sheet 1

Inventor
ROBERT J. DIEKER
By Cohn and Powell
Attorneys

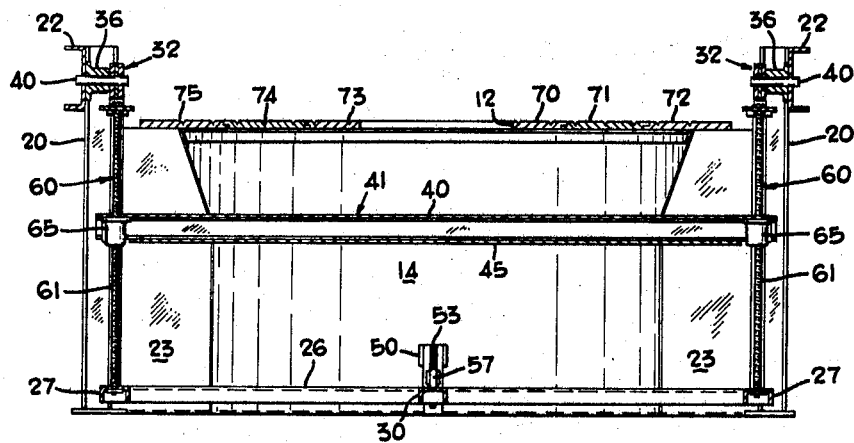
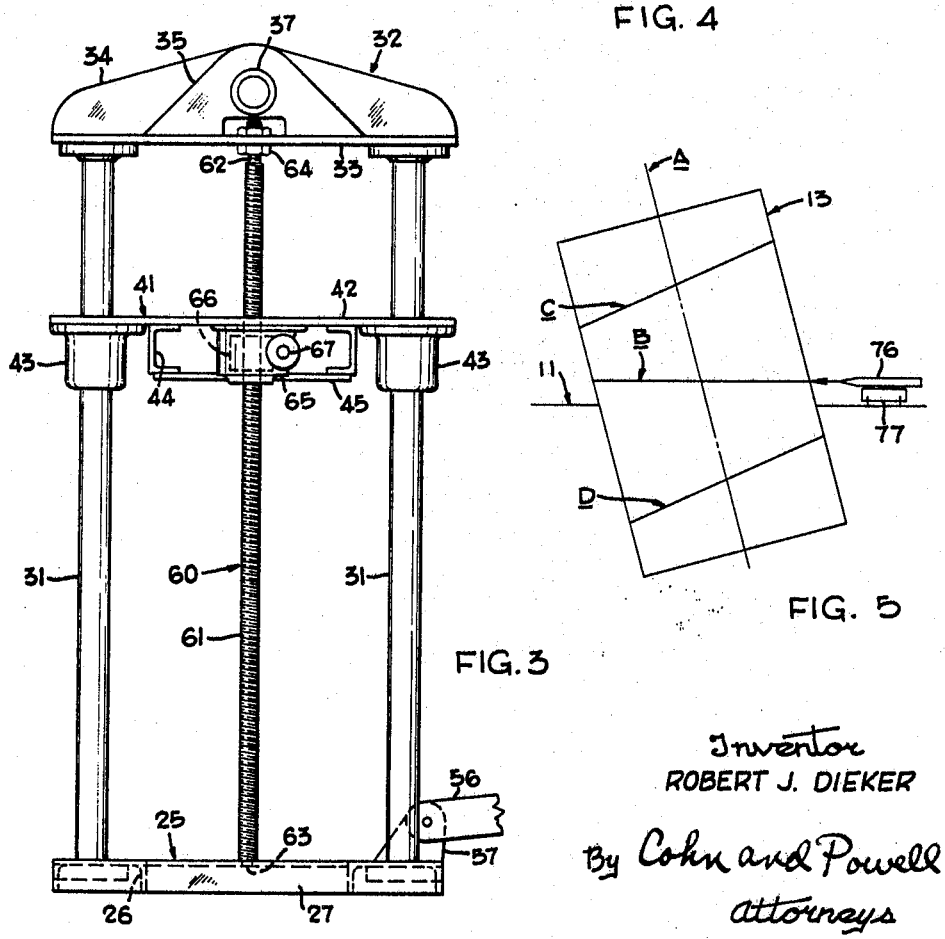

United States Patent Office 3,481,591
Patented Dec. 2, 1969

3,481,591
CUTTING APPARATUS WITH ADJUSTABLE CRADLE TO HOLD WORKPIECE
Robert J. Dieker, St. Louis, Mo., assignor to Kickham Boiler & Sheet Iron Works, Inc., St. Louis, Mo., a corporation of Missouri
Filed Nov. 21, 1967, Ser. No. 684,656
Int. Cl. B23k 7/04, 37/02, 37/04
U.S. Cl. 266—23        15 Claims

ABSTRACT OF THE DISCLOSURE

A positioner for relatively locating a workpiece such as a pipe, and a cutting tool such as a torch, which includes a cradle supporting the workpiece, and a mounting means carrying the cutting tool and moving the tool around the workpiece in a predetermined cutting plane for cutting the workpiece. An angle adjustment means is connected to and selectively swings the swiveled cradle to tilt the workpiece at a predetermined angle to the cutting plane. A height adjustment means selectively raises or lowers the cradle seat member on which the workpiece is supported, whereby to locate the workpiece at a predetermined height relative to the cutting plane. The cradle seat member extends below a table top, and holds the workpiece in a table top opening. The table top is constructed of a plurality of concentric rings that are selectively removable and replaceable to accommodate the opening size to a particular workpiece. The cutting tool is carried by a tractor movably mounted on tracks on the table top about the workpiece.

BACKGROUND OF THE INVENTION

This invention relates generally to improvements to a pipe-cutting apparatus, and more particularly to an improved positioner for holding and locating a workpiece in a cutting plane for cutting by a suitable tool.

In the heretofore conventional types of pipe-cutting machines, the workpiece is usually held and roated about a vertical or horizontal axis, while the cutting torch is maintained in fixed position. There are some machines in which the cutting tool is coordinated with the means for rotating the workpiece so that the tool moves vertically as the workpiece is turned about the vertical axis. Still, other machines utilize a carriage for the torch so that the torch travels around and cuts the workpiece, while the workpiece is held stationary. These prior devices were either limited in the alignment of the cutting plane at an angle to the longitudinal rotative axis of the workpiece or its accurate placement along such axis, or required complicated and expensive parts and equipment to coordinate the rectilinear tool motion and the workpiece rotation. None of these prior pipe-cutting machines used a simple assembly for supporting the workpiece and for precisely locating the cutting plane at the predetermined point along the workpiece length and at the predetermined angle to the workpiece axis, or in such combination, used a cutting tool movable by a simple tractor in a predetermined path relative to such positioned workpiece to cut the workpiece in the cutting plane.

SUMMARY OF THE INVENTION

The positioner includes an angle adjustment means connected to and selectively swinging a cradle about its swivel mounting so as to tilt the workpiece, supported on a tranverse cradle seat member, at a predetermined angle to a cutting plane defined by the peripheral movement of a cutting tool about the workpiece.

The provision of an height adjustment means interconnecting the cradle seat member allows selective elevation or descension of the cradle seat member and supported workpiece, whereby to position the workpiece at a predetermined height relative to the cutting plane.

The cradle includes substantially vertical arms at each side interconnected by a transverse frame. The cradle seat member is carried by an extends between the side arms. The angle and height adjustment means, both incorporate jackscrews that can be operated either manually by a crank or automatically by a power means such as an electric motorspeed reducer unit.

The cradle seat member extends below the table top and below the opening in the table top in which the workpiece is positioned and received. The table top includes plurality of interconnected concentric, annular rings, the innermost ring providing the opening through which the workpiece extends. The rings can be selectively removed or replaced to accommodate the opening size to that of the workpiece.

A tractor, carrying the cutting tool, is movably mounted on the table top for travel in a predetermined path about the workpiece, and is preferably mounted on tracks located on the table top and extending around the table top opening. Each ring in the table top structure is provided with a tractor track.

BRIEF DESCRIPTION OF DRAWINGS

FIG. 3 is a side elevational view of the cradle,
FIG. 4 is a cross-sectional view taken on line 4—4 of FIG. 1,
and
FIG. 5 is a diagrammatic view of the workpiece and cutting tool.

DESCRIPTION OF THE PREFERRED EMBODIMENT

Figure 1:
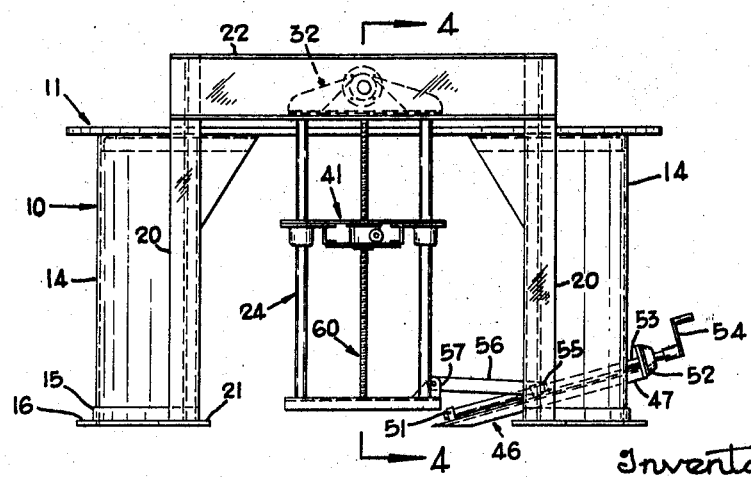
FIG. 1 is a side elevational view of the positioner.

Referring now by characters of reference to the drawings, and first to FIG. 1, it will be apparent that the positioner includes a body frame generally indicated by 10 having a flat, substantially circular table top referred to by 11. The table top 11 is provided with a circular, center opening 12 having a diameter preferably only slightly larger than a workpiece 13, shown diagrammatically in FIG. 5, which is received in the table top opening 12. The body frame 10 includes a pair of opposed, arcuate end walls 14 attached to and supporting the table top 11. The arcuate end walls 14 extend partially around the sides so as to provide a considerable space therebetween under the table top 11. The end walls 14 are supported on bases 15 having foot flanges 16 resting on a subjacent supporting surface such as a floor.

A side frame referred to by 17 is located at each side of the body frame 10 and the table top 11, and is disposed adjacent the space provided between the end walls 14. The side frames 17 are of identical construction so that a detail description of one will suffice for the other.

Figure 2:
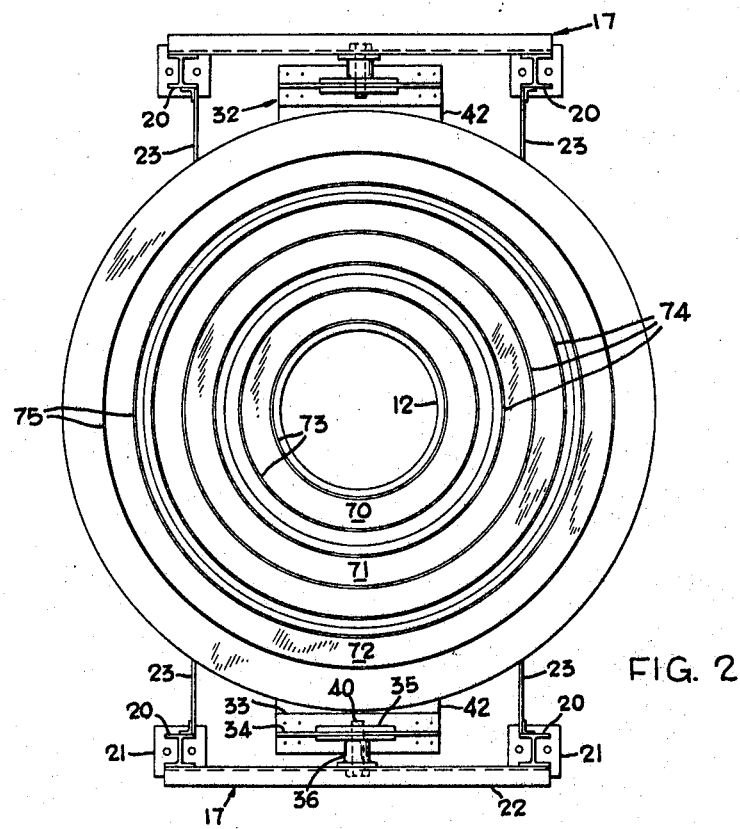
FIG. 2 is a top plan view thereof.

Each side frame 17 includes a pair of substantially vertical posts 20 spaced from each other so that one post 20 is located adjacent each side of the space between the end walls 14. The pair of posts 20 are supported by base plates 21, and are interconnected at the top by a cross beam 22. As is best shown in FIG. 2, each end wall 14 is provided with lateral flanges 23 attached to the adjacent vertical posts 20 of the side frames 17.

Swingably mounted to the side frames 17 is a substantially U-shaped cradle generally indicated by 24. The detailed construction of the cradle 24 is perhaps best shown in FIG. 3.

The cradle 24 includes a transverse frame 25 consisting of elongate, parallel stringers 26 interconnected at each end by a crossbar 27 and in the middle by a similar crossbar 30. Attached to each end of crossbar 27 are a pair of upwardly extending, parallel side arms 31. A crossbeam 32 extends between and interconnects the tops of the side arms 31 at each side of the cradle 24. The crossbeam 32 consists of a substantially flat, horizontal plate 33, an intermediate vertical plate 34, and a pair of reinforcement plates 35 on opposite sides of the vertical plate 34. The side arms 31 are fixed to the horizontal plate 33 of the associated crossbeam 32.

A swivel means mounts each crossbeam 32 to an associated side frame 17. The swivel means includes a journal 36 fixed to the side of the crossbeam 22 intermediate the vertical post 20, the journals 36 being directly opposed and facing inwardly diametrically across the table top 11. The journal 36 is aligned axially with a bushing 37 carried by the vertical plate 34 and reinforcement plates 35 of the crossbeam 32. A stub shaft 40 extends through the journal 36 and bushing 37, and defines the swivel axis of the cradle 24.

With this assembly of cradle 24, the crossbeams 32 are swiveled to associated side frames 17 at a swivel axis located slightly above the table top 11. The side arms 31 extend downwardly from the crossbeams 32 at opposite sides of the table top 11. The interconnecting transverse frame 26 extends below the table top 11 and between the end walls 14.

Reciprocatively mounted on and extending between the side arms 31, is a cradle seat member 41. The cradle seat member 41 is located above the cradle frame 26, and extends between the end walls 14 below the table top 11.

The cradle seat member 41 includes a flat support plate 42 attached to a pair of slide bearings 43 at each end, the slide bearings 43 receiving the pair of side arms 31 at the sides of the cradle 24. The cradle seat member 41 is adapted to support the workpiece 13 at a predetermined angle and at a predetermined height. More specifically, workpiece 13 seats on the support plate 42, and extends upwardly through the opening 12 in the table top 11.

The support plate 42 is reinforced by an elongate box-like structure on its underside. This box-like structure is formed by a pair of laterally spaced, inwardly facing channels 44 attached to the underside of plate 42. Attached to and bridging the lower sides of channels 44 is an elongate, flat plate 45.

The cradle 24 can be selectively swung in an arc about the swivel axis defined by the stub shafts 40 in order to locate the vertical axis A of the workpiece 13, seated on the cradle seat member 41, at a predetermined angle relative to a cutting plane B. The location of the cutting plane B and the cutting operation will be described in more detail later upon further description of parts.

The angle adjustment means 46, provided by a jackscrew, is best shown in FIG. 1. The angle adjustment means 46 includes an elongate, fixed frame 47 extending through an opening 50 (FIG. 4) formed in one end wall 14, the frame 47 including a pair of spaced bearings 51 and 52. A screw 53 is rotatively mounted in bearings 51 and 52. Attached to one end of the screw 53 is a crank 54 for turning the screw 53. Of course, it will be understood that a suitable power unit may be substituted for the manual crank 54. Threadedly received on screw 53 is a nut 55 that travels longitudinally along the screw 53 upon rotation of the screw 53. A link 56 is pivotally mounted to the nut 55 and is pivotally mounted to a bracket 57 attached to the intermediate crossbar 30 of the cradle frame 25.

As the crank 54 is turned, the screw 53 is rotated and the nut 55 moves longitudinally along the screw in a direction depending upon the direction of screw rotation. The axial movement of the nut 55 pushes or pulls the cradle 24 to swing the cradle 24 about the swivel axis defined by shafts 40. Because the workpiece 13 is seated on the cradle seat member 41, the workpiece axis A is located at a predetermined angle relative to the cutting plane B.

A height adjustment means 60, provided by a jackscrew, is operatively connected to the cradle seat 41 at each side of cradle 24. From FIG. 3 it is seen that the height adjustment means includes a screw 61 having reduced ends 62 and 63. The reduced end 62 is threaded and is fixed to the horizontal plate 33 of crossbeam 32 by a pair of cooperating nuts 64 clamped to opposite sides of plate 33. This threaded connection precludes rotation of screw 61. The other reduced screw end 63 is located in a compatible hole formed in the end crossbar 27. The screw 61 is positioned vertically, parallel to and between the spaced side arms 31. A housing 65 is fixed to and carried by the underside of the support plate 42, the coacting screw 61 extending through the housing 65. Rotatively mounted in the housing 65 is a worm gear-nut 66 provided with internal threads and external gear teeth. This worm gear-nut 66 is threadedly connected to the screw 61 and meshes operatively with a compatible worm (not shown). A crankshaft 67 is rotatively mounted on and carried by the housing 65, the crankshaft 67 being drivingly connected to and rotating the worm (now shown) meshing with the worm gear-nut 66.

While a height adjustment means 61 is described in detail, with respect to one side of the cradle 24, it will be understood that an identical height adjustment means is utilized at the other side of the cradle 24. The crankshaft 67 extends longitudinally the length of the cradle seat member 41, and is mounted in the housings 65 at the sides of the cradle 24. Consequently, the crankshaft 67 is utilized to turn the worm gear-nuts 66 simultaneously for raising or lowering the gear-nuts 66 and hence the cradle seat member 41. It will be understood that the crankshaft 67 can be turned manually by a suitable crank (not shown) or turned automatically by some power means such as a motorspeed reducer unit.

The table top 11 is constructed of a plurality of interconnected concentric, angular rings 70, 71, and 72. In the shown embodiment of the table top, opening 12 through which the workpiece 13 extends, closely approximate, yet is larger than, the diameter of the workpiece 13. This center opening 12 is provided by the innermost ring 70. If the opening 12 is required to be larger to accommodate the peripheral dimensions of a tilted workpiece 13 or the diameter of a larger workpiece, the ring 70 may be removed so that such table top opening is then formed by the inside diameter of ring 71. Of course, the ring 71 may be selectively removed, if desired. Either one or both of rings 70 and 71 may be replaced.

Each of the table top rings 70, 71, and 72 is provided with at least a pair of circular tracks 73, 74 and 75 respectively, constituting a part of a mounting means. These tracks 73, 74 and 75 are provided by circular grooves extending around the center opening 12 and around the workpiece 13 received in such opening 12.

A suitable cutting tool 76, such as a torch, is utilized to cut the workpiece in the predetermined cutting plane B. The cutting tool 76 is carried by a tractor 77, constituting a part of the mounting means, the tractor 77 being mounted on the tracks 73 of the innermost angular table top ring 70. If desired, the tractor 70 can be selectively mounted on the tracks 74 or 75 of ring 71 and 72 respectively. The tractor 77 is powered so as to move the cutting tool 76 around the workpiece at a predetermined rate so as to cut the workpiece in the cutting plane B defined by the operative level of tool 76.

It is thought that the functional advantages of the positioner have become fully apparent from the foregoing detailed description of parts, but for completeness of disclosure, the operation will be briefly described. It will be assumed that the workpiece 13 is seated with its lower end on the cradle seat 41, and that the workpiece 13 extends upwardly through the center table top opening 12.

The size of the center opening 12 is determined by the innermost ring 70.

First, the angle adjustment means 46 is actuated to swing the cradle 24 about its swivel axis to locate the longitudinal axis A of the workpiece 13 at a predetermined angle relative to the cutting plane B. The angle of cut is thereby determined. As explained previously, the cradle 24 is swung by manipulating the crank 54 to turn the screw 53, and hence tilt the cradle 24 and supported workpiece 13 as the nut 55 travels along the screw 53.

Then, the crankshaft 67 is manipulated to turn the worm gear-nuts 66, the cradle seat member 41 being elevated or lowered depending on the direction of gear-nut rotation. The height adjustment of cradle seat member 41 positions the workpiece 13 at the appropriate height relative to the cutting plane B. The tractor 76 is energized to move the cutting tool 76 around the workpiece 13, the tool 76 cutting the workpiece 13 in the cutting plane B.

The diagrammatic view of FIG. 5 shows several other lines of cut C and D on the workpiece 13 that may be angularly and height adjusted for placement in the cutting plane B for severance by the cutting tool 76, in the same manner as previously described.

After severance of the workpiece 13 along the illustrated lines of cut, the workpiece sections can be repositioned and welded to form an elbow or curve configuration. Of course, the illustrated lines of cut are merely representative of the definite number that can be attained.

The foregoing and numerous other objects of the invention will more clearly appear from the following detailed description of a preferred embodiment, particularly when considered in connection with the accompanying drawing.

I claim as my invention:

1. In a positioner for relatively locating a workpiece and a cutting tool, comprising:
   (a) framework supporting a cradle including a transverse seat member adapted to support the workpiece,
   (b) a cutting tool,
   (c) mounting means above said seat member carrying the cutting tool and moving the tool around the workpiece in a predetermined cutting plane for cutting the workpiece,
   (d) swivel means mounting the cradle on said framework, and
   (e) angle adjustment means connected to and selectively swinging the cradle to a predetermined position to tilt the workpiece at a predetermined angle to the cutting plane.

2. A positioner as defined in claim 1, in which:
   (f) height adjustment means movably mounts the cradle seat member, and selectively raises or lowers the seat member and supported workpiece so as to position the workpiece at a predetermined height relative to the cutting plane.

3. A positioner as defined in claim 1, in which:
   (f) the cradle includes substantially vertical side arms interconnected by a transverse frame the cradle seat member being carried by and being extended between the side arms.

4. A positioner as defined in claim 3, in which:
   (g) the angle adjustment means includes a jackscrew operatively connected to the transverse cradle frame for selectively swinging the cradle about the swivel means.

5. A positioner as defined in claim 4, in which:
   (h) the jackscrew includes:
       (1) a rotatively mounted screw,
       (2) a traveling nut threadedly received and axially movable on the screw, and
       (3) a link pivotally connected to the nut and to the transverse cradle frame.

6. A positioner as defined in claim 3, in which:
   (g) the cradle seat member is reciprocatively mounted on the side arms of the cradle, and
   (h) height adjustment means is operatively connected to the cradle seat member and selectively moves the cradle seat member on the cradle side arms to position the workpiece at a predetermined height relative to the cutting plane.

7. A positioner as defined in claim 6, in which:
   (i) the height adjustment means includes a jackscrew operatively connected to the cradle seat member for selectively raising or lowering the seat member, whereby to adjust the height of the workpiece.

8. A positioner as defined in claim 7, in which:
   (j) the cradle includes:
       (1) a crossbeam at each side, and
       (2) a pair of the side arms extending between and interconnecting the crossbeam and transverse cradle frame, and
   (k) the swivel means mounts the crossbeam at each side of the cradle.

9. A positioner as defined in claim 8, in which
   (l) at least one jackscrew is located at each side of the cradle, each jackscrew includes:
       (1) a screw extending between and fixed to the associated crossbeam and transverse cradle frame at the side of the cradle, and
       (2) a nut rotatively carried by the cradle seat member and threadedly received on the screw, the nut being axially movable on the screw for raising or lowering the cradle seat member upon rotation of the nut.

10. A positioner as defined in claim 1, in which:
    (f) said mounting means includes a table top provided with an opening, and
    (g) the cradle seat member extends below the table top opening, the cradle seat member being adapted to support the workpiece in the opening,
    (h) the mounting means determines the cutting plane of the cutting tool above the table top.

11. A positioner as defined in claim 10, in which:
    (i) the table top includes a plurality of interconnected concentric, annular rings, the innermost ring providing the opening adapted to receive the workpiece, and the rings being selectively removable and replaceable to change the opening size to accommodate the workpiece.

12. A positioner as defined in claim 10, in which:
    (i) the mounting means includes a tractor movably mounted on the table top in a predetermined path about the workpiece, the tractor carrying the cutting tool in the predetermined cutting plane.

13. A positioner as defined in claim 10, in which:
    (i) the mounting means includes:
       (1) a track on the table top about the opening and the workpiece, and
       (2) a tractor movably mounted on the track, the tractor carrying the cutting tool in the predetermined cutting plane.

14. A positioner as defined in claim 11, in which:
    (j) the mounting means includes:
       (1) a track on each table top ring extending around the opening and workpiece, and
       (2) a tractor movably mounted on the track of one table top ring, the tractor carrying the cutting tool in the predetermined cutting plane.

15. A positioner as defined in claim 1, in which:
    (f) said mounting means includes a table top provided with an opening,
    (g) the cradle includes:
       (1) a crossbeam at each side,
       (2) a pair of substantially vertical sidearms extending downwardly from each crossbeam, and
       (3) a transverse frame interconnecting the pair of side arms at each side of the cradle,
    (h) the swivel means is located on opposite sides of the table top,
    (i) the angle adjustment means includes a jackscrew operatively connected to the transverse cradle frame for selectively swinging the cradle about the swivel means, the jackscrew includes:
(1) a rotatively mounted screw,
(2) a traveling nut threadedly received and axially movable on the screw, and
(3) a link pivotally connected to the nut and to the transverse frame,
(j) the height adjustment means includes a jackscrew operatively connected to the cradle seat member at each side of the cradle for selectively raising or lowering the cradle seat member, whereby to adjust the height of the workpiece, each of the last said jackscrews includes:
(1) a screw extending between and fixed to the associated crossbeam and transverse cradle frame at each side of the cradle, and
(2) a nut rotatively carried by the cradle seat member and threadably received on the screw, the nut being axially movable on the screw for raising or lowering the cradle seat member upon rotation of the nut,
(k) the table top includes a plurality of interconnected concentric, annular rings, the innermost ring providing the opening adapted to receive the workpiece, and the rings being selectively removable and replaceable to change the opening size to accommodate the workpiece, and
(1) the mounting means includes:
(1) a track on each table top ring extending around the opening and workpiece, and
(2) a tractor movably mounted on the track of one table top ring, the tractor carrying the cutting tool in the predetermined cutting plane.

References Cited

UNITED STATES PATENTS 2,753,175   7/1956   Greb et al. _____ 266—23

J. SPENCER OVERHOLSER, Primary Examiner

R. D. BALDWIN, Assistant Examiner

U.S. Cl. X.R.

269—60, 71